July 18, 1967      H. H. POWELL      3,331,760
ELECTROLYTIC MILLING
Filed Jan. 16, 1962
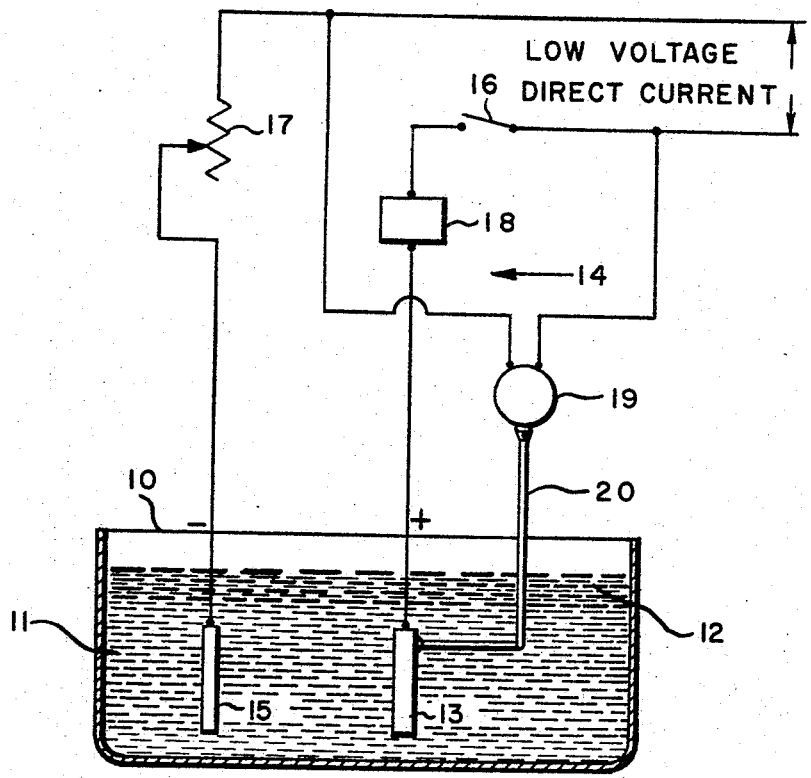
INVENTOR.
HOWARD H. POWELL
BY
ATTORNEYS.

United States Patent Office 3,331,760
Patented July 18, 1967

3,331,760
ELECTROLYTIC MILLING
Howard H. Powell, Fort Worth, Tex., assignor to General Dynamics Corporation, San Diego, Calif., a corporation of Delaware
Filed Jan. 16, 1962, Ser. No. 166,505
13 Claims. (Cl. 204—143)

This invention relates to an apparatus and method for milling or profiling of metallic materials and more particularly to the use of electrolytic milling or profiling of contoured metallic materials in the manufacure of integrally designed stiffeners, formed skin panels and similar parts.

In the fabrication of metallic parts it is often desirable that certain areas be milled out as a weight-saving measure. Those areas having the most mechanical stress remain at the original thickness while those areas subjected to less stress are milled out to provide a thinner section, thereby increasing the strength-to-weight ratio of the part without sacrifice of the utility of the part in its intended use. In this manner structural panels may be formed with integral stiffening members on either or both surfaces thereof.

Heretofore this was done by machining, electrical disintegration and chemical milling. Machining was costly, time consuming and required special machines for certain types of work. Moreover, heat generated in this manner affected the structure of the part, such as in surface stresses and microcracks which tended to facilitate failure of the part under unfavorable environmental conditions. In electrical disintegration the workpiece served as one electrode and another electrode of opposite polarity was brought to within the breakdown point of the dielectric separating them. The ensuing spark would instantly remove a minute particle of the workpiece. The electrode had to be shaped in accordance with the contour of the area to be removed from the workpiece. Control over the rate of cutting required a control of the length and intensity of the individual spark impulses and also the interval between them. This is done by auxiliary circuitry and equipment for varying the voltage and maintaining a uniform gap between the electrode and workpiece as the sparks removed particles from the workpiece. While this method is satisfactory for milling small parts it has obvious limitations in the fabrication of larger structures.

Chemical milling is a recent development in which certain areas of a workpiece are coated with a suitable chemical resistant mask and the part is exposed to a chemical solution which attacks the exposed unmasked areas. Metal is removed by immersion in a chemical bath and dissolved by chemical action. The problems and difficulties encountered with this method are usually centered around the control of the action of the etching medium. Depth of cut control requires temperature control, concentration control during use or compensation for change in concentration during use, and timing in accordance with the varying conditions affecting the etching rate of the solution. Variations in materials and their hardness are reflected in the etching rate also. Moreover, chemical reagents in etching of certain alloys produce a hard scale on the surfaces of the tanks and heater coils, if so heated. Severe etching action disturbs the masking and undercutting under the edge of the masking, causing poor definition. This presents a problem where close tolerances are required.

These and other problems in the prior methods of milling of materials are overcome in the electrolytic milling process comprising this invention. Here a masked part is submerged in a tank containing a proper electrolytic solution and suitable cathode. The part becomes the anode when connected to the positive side of a controllable direct current. The exposed or unmasked portion of the part is subjected to electrolytic action which displaces material from the part at a controllable rate and to the desired finish. The milling process may be further aided by the employment of high frequency vibrators attached to the object part, and the use of an interrupted current. Because the solution is not chemically active in the absence of current flow, i.e., has no appreciable cutting, milling, or etching effect, current regulation controls the etching rate and depth of cut. This method has the following advantages:

(1) Absence of toxic health hazards.
(2) The method will produce a milling of all known metallic materials.
(3) Hardness and varying alloys is not a major problem in its use.
(4) The electrolytic solution has a long life, providing a low cost per pound of metal removal.
(5) Less masking trouble because of gentle ionized action.
(6) The rate of metal removal is controlled by exact current control.
(7) Deposition of hydrogen at the opposite pole prevents hydrogen embrittlement.

It is therefore an object of this invention to provide for a novel method and apparatus for milling structural parts.

Another object is the provision of a method of removing metal through the use of a solution which is chemically inactive in the absence of an applied current.

Another object is the provision of an electrolytic process of milling formed metallic materials through controlled removal of metal.

Another object is the provision of a process of controlled metal removal from a part whereby extremely well defined edges and desired surface textures may be produced to a close tolerance.

Another object is the provision of a method of removing metal from designated areas of formed panels to provide integral panels of varied thicknesses.

Another object is the fabrication of integrally designed stiffening or reinforcing of contoured panels by an electrolytic milling process.

Another object is the provision of formed structural panels having a high strength-to-weight ratio in which those portions to be subjected to less stress are reduced by an electrolytic milling process to a less thickness than those portions to be subjected to greater stress.

Another object is the provision of an electrolytic process for milling a contoured part wherein the part is rapidly vibrated in an electrolytic solution.

Another object is the provision of an electrolytic process for milling a contoured part wherein the part is an anode in the current conducting system and the current passing therethrough is interrupted direct current.

Other objects and features of the present invention will be readily apparent to those skilled in the art from the following specification and appended drawing wherein is illustrated a preferred form of the invention, and in which:

The figure is a combined sectional view and schematic illustration of the apparatus of the invention suitably arranged for practice of the instant process.

Generally, a masked metallic part to be shaped is submerged in a tank containing a proper electrolytic solution and a suitable cathode. The object part becomes the anode when connected to the positive side of a controllable DC current. The exposed or unmasked portion of the part is subjected to electrolytic action which displaces material from the part at a controllable rate and to the desired finish. The process is substantially facilitated by the employment of a high amperage or high density interrupter in the electrical circuit, and vibrating the object part at a high rate of frequency.

Referring now to FIGURE 1, a tank 10 is provided with a suitable electrolytic solution 11, topped by a thin layer of an immiscible veiling fluid 12 such as oil, to retard the escape of gases released in the electrolysis, and to prevent atmospheric contamination of the electrolyte 11. Tank 10 is either fabricated of a dielectric material, or has its inner surface lined with such a material. The object metallic part 13 to be shaped is completely immersed in electrolyte 11 and connected to the positive side of a controllable direct current electrical circuit 14, thus becoming an anode. A suitable electrically conductive material, such as a graphite plate, is provided as a cathode 15 and is connected to the negative side of electrical circuit 14. This also is completely immersed in electrolyte 11. Various types and strengths of electrolytes 11 may be employed in the process, dependent upon the alloy or composition of the object part 13 to be shaped. A sodium chloride solution, comprising 3500 grams of salt to 13.2 liters of water, has been found to be an excellent electrolyte 11 for the shaping of object parts 13 composed of aluminum. However, other solutions and densities have also been found suitable.

Upon the application of a low voltage, high amperage direct current to the system through an electrical motor generator, not shown, or rectifier circuit 14, electrolysis takes place and aluminum ions become free of the part, forming sodium aluminate (NaAlO$_2$) and sodium hydroxide (NaOH) with the electrolyte. Thus, metallic ions are liberated from the parent object, part 13. Such erosion is effected by the passage of direct current from the object part 13 to cathode 15 through electrolyte 11. These metallic ions may react chemically with electrolyte 11 and fall to the tank bottom as a precipitate, or may be deposited on cathode 15 as a pure metal and salvaged for other use. The object part 13 is masked with a dielectric material such as a neoprene coating, in areas where no erosion is desired, so that only the exposed or unmasked portion of the part is subjected to the electrolytic action which displaces metallic ions from such part 13. The electrical circuit 14 is provided with a switch 16 in a conventional manner, and a rheostat 17 to control the amperage within the circuit.

Use of the above apparatus results in the formation of large oxygen bubbles on the anode surface creating voids, interrupting the current flow and insulating the surface from electrolytic action. This affects both the milling rate and the surface finish. However, by causing minute bubbles to be liberated instead of larger ones, a localized agitation of the electrolyte may be provided, permitting better control over the milling rate and providing a smoother surface finish. This is accomplished by a high frequency interrupter 18 connected in series with switch 16 and causing recurrent interruption of the flow of direct current through circuit 14 at a high frequency, more fully described hereinafter. Because of this flow-no flow current control by the interruptor, the anode, part 13, is provided with a high density impact of current rather than a continuous current flow. The interrupter may be of conventional design, a vibrator having been found particularly suitable for this application.

As the part is being milled by the electrolytic action, surface sludge of decomposed metal and film retards electrolytic action, entraps gas bubbles and affects the rate of milling. In addition to suspending the part in a substantially upright position, a vibrator 19 is used. For this purpose a mechanical vibrator has been found satisfactory. Although this vibrator is electrically driven and is shown connected in parallel in circuit 14, other types of driven means, as for example a pneumatic vibrator, may be used. Vibrator 19 vibrates the part 13 through a mechanical linkage 20 and thus establishes a "scrubbing" action between the object part 13 and the electrolytic solution 11 to thereby dislodge the surface sludge and film. The use of current interrupter 18 and vibrator 19 in the system thus not only substantially increase the disassociation of the metallic ions from the parent part 13 at an optimum rate for the current applied but they also provide for more accurate control over the milling rate through current control.

In a typical milling operation a part having a thickness at least as great as the maximum thickness desired, is formed to the desired curvature by pressing, bending, hammering or by other conventional means. Typical of such parts are structural members of high strength-to-weight ratios which by the masking of certain portions thereof are provided with stiffening and reinforcing members which exceed the thickness of the adjacent unmasked portions etched away during milling. After forming, the part, designated herein as 13, is cleaned and appropriately masked, with only those surface portions left exposed from which material is to be removed in reducing the part of workpiece thickness. The part is then attached, as illustrated in the drawing, to the positive side of the direct current conducting circuit 14 to serve as the anode 13, and a plate of suitable electrically conductive material is attached to the circuit negative side to serve as the cathode 15. As indicated in the examples set forth below, particular frequencies both for the interruption of the applied D-C current and for the vibration of the part have been found particularly satisfactory.

*Example I*

The part 13 was comprised of 2024–T86 aluminum, with the sodium chloride solution described above used as the electrolyte. The part, measuring 4½ inches x 6 inches x ⅜ inch, was first prepared by cleaning and was then suitably masked in those areas not to be etched. An area of 12.25 square inches was left exposed on one face and an area of 10.25 square inches was left exposed on the other face. The part was then connected to the positive side of the circuit, the part serving as the anode. A plate of the same material and of the same size was attached to the negative side of the circuit to function as the cathode. The part or anode 13 and the cathode were positioned generally upright in the electrolyte, as shown in the drawing, and were spaced about 8 inches apart, the 12.25 square inch exposed area of the part confronting the cathode. A potential of 14 volts was applied to the circuit, effecting a current flow in the circuit of 40 amps. An electric vibrator was used as the current interrupter 18, serving to effect interruption of circuit current flow at a frequency of about 300 cycles per second. Vibration of the anode was accomplished at a frequency of about 320 cycles per second through use of an air driven mechanical vibrator, designated as 19 above. The part was subjected to etching for a period of 45 minutes. The maximum depth of etch achieved was .048 inch, which occurred on the face of part 13 confronting the cathode. On the reverse face the maximum depth of etch was .043 inch.

*Example II*

Utilizing the same electrolyte and the same circuit connections as in Example I above, a part 13 comprised of 7075–T6 aluminum measuring 4½ inches x 6 inches x ½ inch was subjected to etching after prior appropriate cleaning and masking. Areas of 9.75 square inches and 9.625 square inches were left exposed on either face of the part and an approximate 8 inch spacing between the anode and the cathode was maintained, the anode and cathode being positioned generally upright as in Example I, and with the 9.75 square inch exposed area of the anode part 13 confronting the cathode. An impressed potential of 14 volts effected a current flow in the circuit of 50 amperes. Current interruption by means of the electrical vibrator 18 and vibration of the test piece by means of air driven vibrator 19 were similar to the interruptions and vibrations effected in Example I, i.e., respectively 300 cycles per second and 320 cycles per second. The test was conducted for a period of 45 minutes and the maximum depth of etch achieved was .043 inch on the face confronting the cathode. The maximum etch depth on the reverse face was .035 inch.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. Apparatus for controlling the milling rate on a part connected as an anode in an electrically energized solution through elimination of large oxygen bubbles which form on the anode surface causing voids, current interruption and surface insulation from electrolytic action, said apparatus comprising means for electrically energizing said solution, means connected to said anode for dislodging and removing surface sludge of decomposed metal resulting from said milling, said dislodging means comprising a vibrator which vibrates the part at a frequency of about 320 cycles per second, and means for locally agitating said solution around said part through creation of a multitude of minute bubbles by application to said anode of electrical energy, said agitating means comprising an interruptor which effects recurrent interruption of the electrical energy to said anode at a frequency of about 300 cycles per second.

2. Apparatus for electrolytic milling of a part comprising: a container adapted for retaining an electrolytic solution chemically active with the material of a part to be milled in the presence of an applied current, means for applying electrical energy through said solution; said means including a cathode and an anode, said anode being adapted to include a part to be milled, means for recurrently interrupting said energy at a frequency of about 300 cycles per second, and means adapted for vibrating a part to be milled, thereby providing elimination of large oxygen bubbles which form on a part surface causing voids, current interruption, and surface insulation from the electrolytic action of said solution.

3. Apparatus for controlling the milling rate of a part serving as an electrical contact in an energized electrolytic solution through the elimination of large oxygen bubbles which form on the surface of the contact causing voids, current interruption, and surface insulation from the electrolytic action of said solution; said apparatus comprising vibrator means for recurrently interrupting solution-energizing electrical energy at a frequency of about 300 cycles per second, and means adapted for vibrating the part being milled while in said solution.

4. The apparatus defined in claim 3, wherein said vibrating means effects vibration of the part being milled at a frequency of about 320 cycles per second.

5. Apparatus for removing material from a part to increase the strength-to-weight ratio of the part comprising: means for containing an electrolytic solution chemically active with the material to be milled in the presence of suitable electrical energy, means for applying electrical energy through said solution, said last mentioned means including means for interrupting said energy at a frequency of about 300 cycles per second, the part being milled serving as a portion of said energy applying means and being at least partially submerged in said solution, and means for vibrating the part.

6. Apparatus for milling a part comprising: means for containing an electrolytic solution chemically active with the material of the part to be milled in the presence of a suitable current, circuit means adapted for supplying electrical energy to said solution, said circuit means including anode and cathode members, said part to be milled serving as at least a portion of the anode member, means for interrupting at a frequency of about 300 cycles per second the energy supplied to said solution, and means adapted for vibrating the part during milling thereof.

7. The method of milling a part comprising the steps of masking those portions of the part where milling is undesirable; placing the thus masked part in an electrolytic solution adapted for chemical activity with the unmasked material of the part, the solution having no chemical reaction with the part in the absence of electric current flow therethrough; applying a positive D-C current through the part and the solution to create chemical reaction therebetween to effect milling of the part; and interrupting the current flow at a frequency of about 300 cycles per second, thereby causing the elimination of large oxygen bubbles which cause voids, current interruption and surface insulation from electrolytic action of the solution.

8. The method defined in claim 7, additionally including the step of vibrating the part while undergoing milling.

9. The method defined in claim 8, wherein the part is vibrated at a frequency of about 320 cycles per second.

10. In the art of fabricating integral form structural panels of high strength-to-weight ratio, the method of removing panel material from areas wherein less than maximum thickness is desired comprising the steps of: masking the areas of the panel where material removal is undesirable, placing the panel in a suitable electrolytic solution having a positive D-C circuit associated therewith for energizing the solution, connecting the panel as the anode in the D-C circuit, recurrently interrupting at a frequency of about 300 cycles per second the flow of solution energizing current, and vibrating the panel while the solution is energized.

11. The method for removing material from a part comprising the steps of: masking desired areas of the part, immersing the part in an electrolytic solution chemically reactive with the material of the part in the presence of a suitable current, connecting the part to an electrical circuit which serves to energize the solution for removing at least a portion of the unmasked material, interrupting the electrical circuit at a frequency of about 300 cycles per second, and vibrating the part at a high frequency rate which is different than the circuit interrupting rate.

12. The method defined in claim 11, wherein the electrolytic solution is a sodium chloride solution.

13. The method defined in claim 12, wherein the material being removed is aluminum.

References Cited

UNITED STATES PATENTS

| 1,427,877 | 9/1922 | Weeks | 204—143 |
| 1,442,977 | 1/1923 | Schwuchow et al. | 204—143 |
| 2,058,365 | 10/1936 | Stark | 204—143 |
| 2,074,221 | 3/1937 | Holland | 204—143 |
| 2,421,863 | 6/1947 | Beck | 204—141 |
| 2,564,823 | 8/1951 | Wallace | 204—228 |
| 2,793,992 | 5/1957 | Heuser | 204—143 |
| 2,905,605 | 9/1959 | Keeleric | 204—143 |

FOREIGN PATENTS

| 789,293 | 1/1958 | Great Britain. |
| 1,241,349 | 8/1960 | France. |

JOHN H. MACK, *Primary Examiner.*

JOHN R. SPECK, *Examiner.*

P. SULLIVAN, RAY L. GOOCH, W. VAN SISE,
*Assistant Examiners.*